July 24, 1934.  K. J. E. HESSELMAN  1,967,243
INTERNAL COMBUSTION ENGINE
Filed Oct. 29, 1931   3 Sheets-Sheet 2
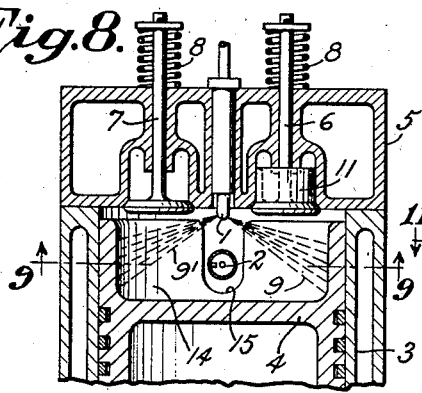
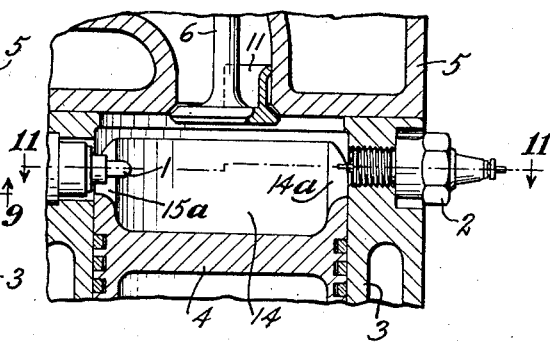
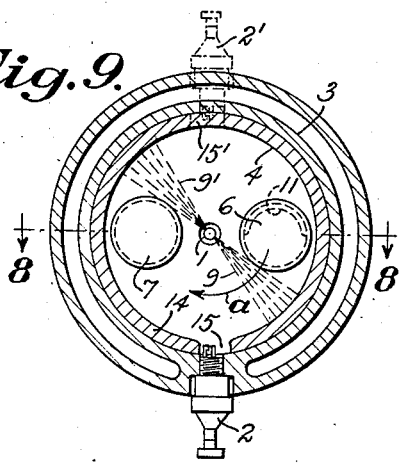
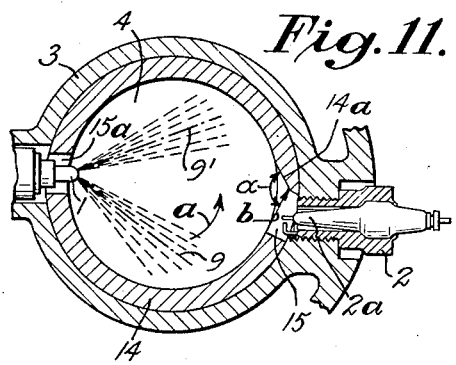
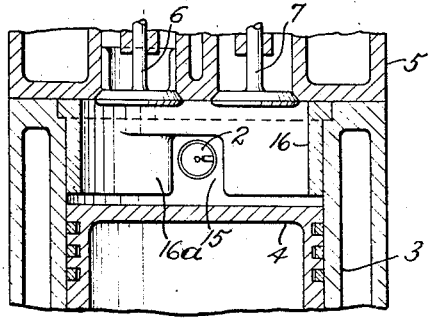
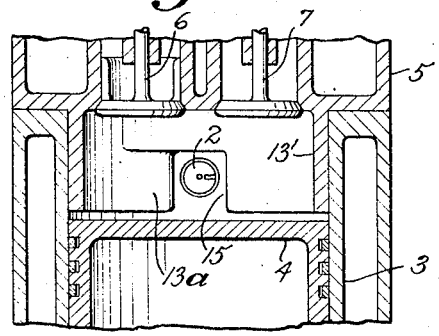
INVENTOR
Knut Jonas Elias Hesselman
BY Wm T. Hedlund
his ATTORNEY July 24, 1934.　　　K. J. E. HESSELMAN　　　1,967,243
INTERNAL COMBUSTION ENGINE
Filed Oct. 29, 1931　　　3 Sheets-Sheet 3

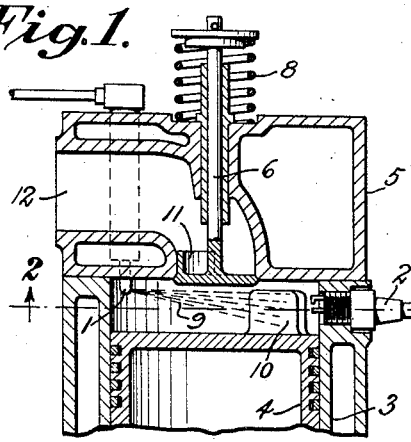
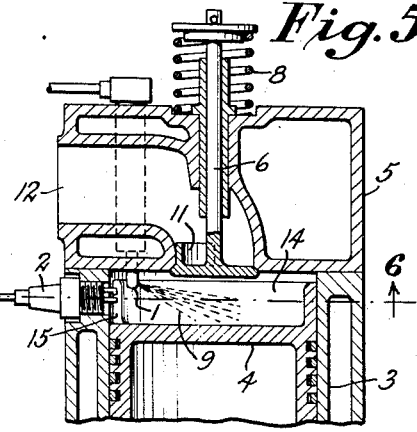
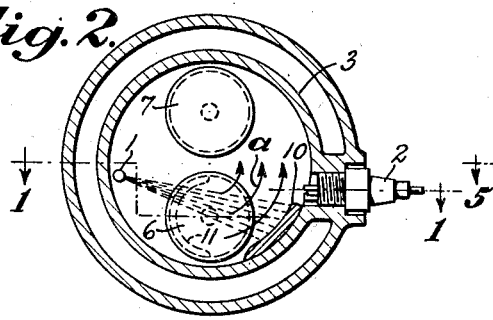
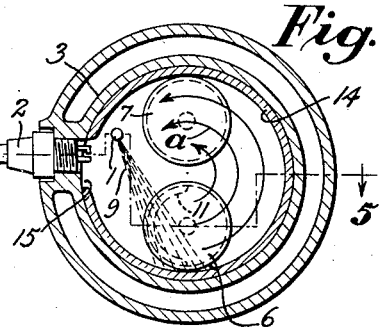
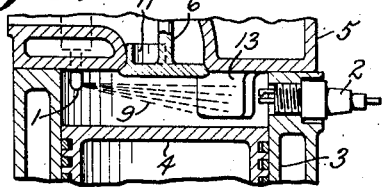
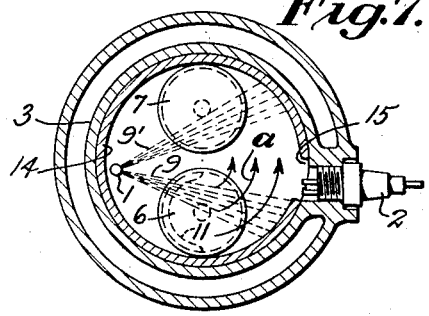
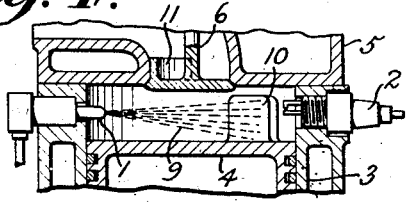

INVENTOR
Knut Jonas Elias Hesselman
BY
Wm. T. Hedlund
his ATTORNEY

Patented July 24, 1934

UNITED STATES PATENT OFFICE 1,967,243

INTERNAL COMBUSTION ENGINE

Knut Jonas Elias Hesselman, Saltsjo-Storangen, Sweden, assignor to Hesselman Motor Corporation, Ltd., London, England, a corporation of Great Britain Application October 29, 1931, Serial No. 571,874
In Sweden December 31, 1926

20 Claims. (Cl. 123—32)

This application is a continuing application, relating back to my copending application Serial No. 473,332 filed August 6, 1930, and consequently to my copending application Serial No. 240,555, filed December 16, 1927, for all common subject matter herein continued, and also replaces my copending application Serial No. 485,845 filed October 2, 1930.

The present invention relates to internal combustion engines and has particular reference to that type of engine in which finely divided fuel, preferably liquid, is injected into a moving body of air in the combustion chamber of an engine cylinder and then after mixing, is ignited by being moved to the vicinity of electric or other timed igniting means. Still more particularly the present invention relates to internal combustion engines in which the combustible fuel charge is formed and ignited in accordance with the method disclosed and claimed in U. S. Patent No. 1,835,490, granted December 8, 1931, on my application Serial No. 473,332 above referred to.

Since the invention is particularly adapted for use in engines in which the charge is formed and ignited in accordance with the above noted method, it will be described by way of example as applied to an engine adapted to be operated in accordance with such method but it is to be understood that the invention is not limited to the particular kind of engine disclosed herein by way of example but may also be made use of with other types of engines.

I have found that in engines in which finely divided liquid fuel is injected into a mass of moving air in the combustion chamber and the resulting mixture ignited by timed electrical igniting means, the igniting means should be protected from direct impingement of the injected fuel in order to prevent fouling of the igniting means and consequent failure of dependable ignition.

The general object of the present invention is to insure dependable ignition and to prevent fouling of the igniting means by providing an improved combustion chamber arrangement which will afford protection of the igniting means against direct impingement of liquid fuel while at the same time permitting the igniting means to be placed in such a position that at the time of ignition the igniting means is in the presence of a readily combustible mixture of fuel and air.

In order to attain the above general object and to secure the advantages to be derived therefrom and from other and more detailed objects, as will hereinafter appear, I provide a pocket for the reception of the igniting means which pocket may be formed in numerous different specific ways, and in conjunction with such pocket I provide an impact surface within the combustion chamber toward which surface all or a part of the fuel is injected, the relative positioning of the pocket and the impact surface being such that the igniting means is protected against direct impingement of fuel by what I will term the trailing edge of the impact surface, this edge being the edge last contacted by the moving fluid contents of the combustion chamber before they pass the igniting means.

In the accompanying drawings forming a part of this specification I have illustrated a number of different forms of combustion chambers adapted to carry the invention into effect.

In the drawings:

Fig. 1 is a more or less diagrammatic illustration of the combustion chamber of a cylinder of a four cycle engine embodying the invention;

Fig. 2 is a section taken on the line 2—2 of Figure 1;

Figs. 3 and 4 are views similar to Fig. 1 showing variations in the structure;

Fig. 5 is a view similar to Fig. 1 showing still another arrangement;

Fig. 6 is a section taken on the line 6—6 of Fig. 5;

Fig. 7 is a view similar to Figs. 2 and 6 showing still another form of construction;

Fig. 8 is a view similar to Fig. 1 illustrating still another form of combustion chamber embodying the invention, this form being particularly adapted for engines having cylinders of large diameter.

Fig. 9 is a section taken on the line 9—9 of Fig. 8;

Fig. 10 is a view similar to Fig. 1 showing a still further form of combustion chamber for carrying the invention into effect, this form embodying an additional feature not disclosed in the preceding diagrammatic figures.

Fig. 11 is a section taken on the line 11—11 of Fig. 10;

Figs. 12 and 13 show further modifications embodying the improved feature shown in Fig. 11;

Figure 14:
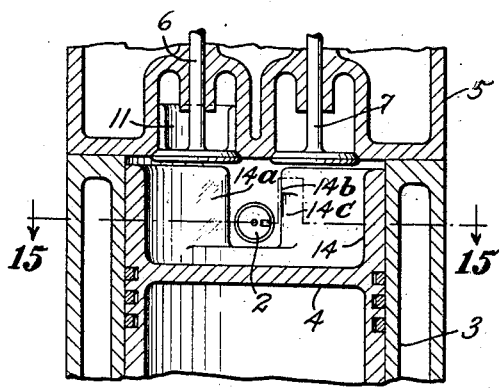
Fig. 14 shows another form of combustion chamber embodying a still further feature not included in the preceding forms.

Referring now to the drawings, more particularly Figs. 1 to 7, 3 designates the usual water jacketed cylinder in which is located the piston 4. The upper end of cylinder 3 is closed by the usual water jacketed cylinder head 5 in which are seated the inlet valve 6 and exhaust valve 7. These valves are closed by springs 8 and are opened by the ordinary form of cam actuated rocker arms (not shown).

Finely divided fuel is injected into the combustion chamber through the injection nozzle 1, which in all of the above forms except that shown in Fig. 4 projects through the cylinder head so as to enter the combustion chamber at a point adjacent its periphery. The injection nozzle is drilled to project one or more jets across cords of the cylinder, single jets 9 being indicated in Figs. 1 to 6 and dual jets 9 and 9' being indicated in Fig. 7.

The inlet valve 6 is provided with a semi-circular skirt 11, this skirt operating when the inlet valve is open during the suction stroke of the piston to cause the air admitted through the inlet passage 12 to rotate as it enters the cylinder. Injection occurs after the air is admitted and preferably is timed so as to occur during the latter part of the compression stroke of the piston.

It will thus be seen that the fuel is injected into a body or mass of air which has already been set in motion within the engine cylinder.

The fuel injected into the moving air mass, transversely of the direction of movement of the air (see the arrows "a" Fig. 2) mixes with the moving air to form a combustible mixture which is carried past the igniting device 2, the latter advantageously being in the form of the usual high tension electric spark plug having electrodes in communication with the combustion chamber and comprising exposed metal portions separated by insulating portions.

As will be evident from Fig. 2, the fuel is injected into the cylinder, with reference to the direction of air movement, so that it first mixes with the air and the resulting mixture of fuel and air then passes across in front of the electrodes of the spark plug.

I have found from experience that with this form of injection some of the fuel (particularly where heavy grades of fuel such as Diesel oil are employed) is projected completely across the cylinder in relatively liquid form and impinges against the cylinder wall. Such fuel as does reach and impinge upon the cylinder wall in liquid form mixes with the lubricating oil and is not only lost for combustion purposes but also acts to undesirably dilute and impair the lubricating quality of the lubricating oil. I have also found that a part of the injected fuel tends to be carried in the form of relatively large droplets circumferentially of the cylinder by the moving air and a portion of the fuel in this state will, unless such action is prevented, impinge upon and ultimately adversely affect the dependable operation of the spark plug by fouling either one or both the exposed metal portions and insulating portions of the electrodes.

In order to overcome this difficulty, I provide an impact surface within the cylinder which is so located that any fuel which may be projected by the injection nozzle clear across the cylinder strikes the impact surface rather than the relatively cool cylinder wall and is carried from this surface by the moving air in a path such that direct impingment of fuel in liquid form against the spark plug is avoided.

In the cylinder illustrated in Figs. 1 and 2, this impact surface is provided by an upstanding segmental flange 10 projecting from the periphery of the piston 4 and situated, with respect to the moving air, immediately ahead of the electrodes of the spark plug 2. As will be evident from Fig. 2, the trailing edge of the flange 10, in conjunction with the bore provided for the reception of the spark plug, forms what is in effect a pocket in which the spark plug electrodes are located. It will also be noted that the electrodes are located back of a line tangent to the impact surface at the trailing edge thereof. I have found from experience that a satisfactory position of the air gap between the electrodes is about two millimeters back of the above described tangent. The electrodes are advantageously placed as shown in Fig. 2 not only back of a tangent as above described, but also immediately adjacent to the trailing edge of the impact surface.

While the illustrated positions of the spark plug and the above stated position of the air gap represent what I consider to be the most satisfactory arrangement from the standpoint of protection to the plug, it is to be understood that the exact positioning of the plug in its protected position relative to the combustion chamber may be varied within the scope of the invention. The action of the rapidly recurring spark jumping across the air gap of a high tension plug, or the heat generated at the equivalent point of other electrical ignition devices, may in some instances tend to minimize the formation of deposits tending to foul the device at this point. In all cases, however, the insulating portions of the electrode or electrodes must be protected, since it is the accumulation of oil, carbon deposits or the like across such insulating portion or portions of the electrodes that is most likely to produce the fouling which it is a major object of the present invention to avoid.

In Figs. 3 and 4, I have illustrated variations of the general arrangement shown in Fig. 1. In Fig. 3, the flange 13 projects downwardly from the cylinder head rather than upwardly from the piston as in the form shown in Fig. 1. I prefer the form shown in Fig. 1 to that shown in Fig. 3.

In Fig. 4 the same flange arrangement is illustrated as that shown in Fig. 1 the only difference between the two structures being that in Fig. 4 the injection nozzle 1 projects into the combustion chamber through the side walls of cylinder 3 rather than through the cylinder head 5.

In Figs. 5 and 6, I have illustrated another combustion chamber arrangement adapted to be used with a variant of the method of charge forming employed when the construction shown in Fig. 1 is used.

The specific method of charge forming and igniting forms no part of the present invention and will therefore not be described herein in detail. For a complete disclosure of the method of charge forming and igniting for which the examples of construction herein illustrated by way of example are particularly adapted, reference may be had to Patent No. 1,835,490, previously referred to.

In the present form of structure the portion of the cylinder wall toward which the injected fuel is directed is spaced a material distance in advance of the spark plug, considered in the direction of movement of the air in the combustion chamber. In order to secure the best results with this combustion chamber arrangement, I provide a circular piston flange 14 on the piston, which flange extends entirely around the periphery of the piston except for the slot 15 adjacent one wall of which the electrodes of the spark plug 2 are situated. As will be evident by a comparison of Figs. 2 and 6, this arrangement, insofar as the present invention is concerned and with reference to the protection of the spark plug, functions in exactly the same manner as does the arrangement illustrated in Fig. 2.

In Fig. 7, I have illustrated the form of piston flange employed in the form shown in Fig. 5, combined with a fuel injection arrangement of the same type illustrated in Figs. 1 to 4. In the present form, while the fuel injection arrangement is similar to that shown in Figs. 1 to 4, in that the jet 9 is projected across the cylinder in the same manner as in Figs. 1 to 4, an additional jet 9' is employed. As will be evident from the figure the arrangement of the flange providing the impact surface is such that the spark plug is protected from direct impingement of fuel from either of the jets and the cylinder wall is in addition protected against impingement thereagainst, either directly or indirectly, of fuel from either jet.

The arrangement illustrated in Figs. 8 and 9, is particularly adapted for use with engines having cylinders of relatively large bore and in which injection is from a centrally located nozzle projecting one or more jets, indicated at 9 and 9', radially of the cylinder. In this form I prefer to use the peripheral type of piston flange 14 provided at 15 with a slot into which project the electrodes of the spark plug 2. As indicated in Fig. 9, dual ignition may be employed by the use of an additional spark plug indicated at 2', in which case the piston flange 14 would be provided with a second slot 15', with respect to which the plug 2' would be situated in the same manner as is the plug 2 with respect to slot 15.

In Figs. 10 and 11 I have illustrated a combustion chamber arrangement combining the features shown in Figs. 4 and 7 in that the injection nozzle projects into the combustion chamber through the cylinder wall and a flange 14 of the type illustrated in Fig. 7 is employed. This arrangement I have found operates very satisfactorily in practice. In the present arrangement the flange 14 is provided with a second slot 15a for the injection nozzle substantially opposite the slot 15 forming the pocket for the reception of the spark plug electrodes and the slot 15 incorporates a further feature of construction not illustrated in the forms heretofore described. By reference to Fig. 11 it will be seen that the tangent to the impact surface at the trailing edge thereof is indicated by the line "b" and that the wall of the slot 15 facing the direction of movement of the air in the cylinder, which wall is opposite the wall forming the trailing edge of the impact surface, is cut away as at 14a so as to provide between this wall and the tangent to the impact surface at the trailing edge thereof (indicated by line "b"), an angle α which is greater than 90 degrees. Preferably angle α is materially greater than 90 degrees.

In the apparatus shown in Fig. 11 I have illustrated in section a high tension spark plug of the usual or standard type, which form of ignition device I have found to be satisfactory in practical operation. From the figure it will be evident that the insulating portion 2a of the central electrode is well protected against direct impingement of fuel, which as I have previously pointed out is of particular importance since this portion of the plug structure is cooler than the points of the electrodes where the spark occurs and is therefore more likely to have accumulate thereon oily deposits tending to foul the plug and render it inoperative due to short circuiting.

By providing a pocket the wall of which is arranged as shown, I prevent the possibility of liquid fuel being deflected into the pocket after having been carried across in front of the electrodes and striking the far wall of the pocket. As will be evident from the figure, any fuel carried in liquid form across the face of the pocket and striking the surface 14a will be deflected into the combustion chamber and not into the spark plug pocket. Furthermore this arrangement reduces the amount of turbulent movement of the charge passing across the front of the spark plug pocket and aids in carrying into effect the particular method of charge forming and igniting disclosed and claimed in Patent No. 1,835,490 previously referred to.

In Figs. 12 and 13, two variations of the form of pocket illustrated in Fig. 10 are shown. In Fig. 12 the impact surface is provided by the circumferential liner 16 set in the upper part of cylinder 3 and provided with a slot 15, one wall of which is beveled as at 16a in the same manner that the flange 14 is beveled or rounded off at 14a. The liner 16 may be provided with a second slot 15a in the flange 14 in case the injection nozzle enters the combustion chamber through the side wall of the cylinder or it may be of the general form of the flange 14 shown in Fig. 7 if the injection nozzle projects into the combustion chamber through the cylinder head.

The construction illustrated in Fig. 13 is similar to that shown in Fig. 12, the only difference being that the impact surface is provided by a circumferential flange 13' forming a part of the cylinder head. This flange is similar to the flange 13 shown in Fig. 3 but is extended around the entire circumference of the cylinder. Flange 13' has been shown as provided with a slot 15 for the reception of the spark plug 2 and having the beveled wall 13a similar to the beveled wall 16a shown in Fig. 12. As in the form of construction shown in Fig. 12, the flange 13' may or may not have a second slot through which the injection nozzle is adapted to project, depending upon whether the injection nozzle enters the combustion chamber through the cylinder side wall or the cylinder head.

Figure 15:
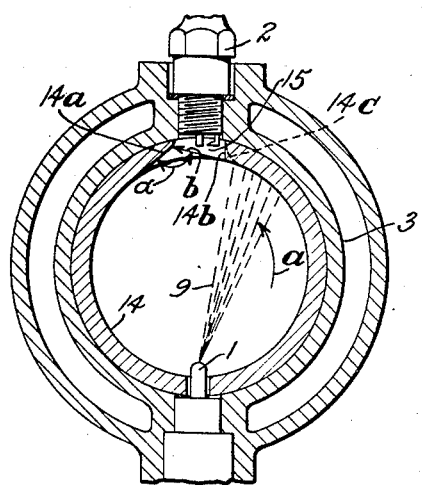
Fig. 15 is a section taken on the line 15—15 of Fig. 14.

In Figs. 14 and 15, I have illustrated still another modification which incorporates an added feature of construction not shown in the preceding modifications, which added feature is applicable to the forms of apparatus in which the impact surface is provided by a flange on the piston. In the present modification the piston is provided with an upstanding circumferential flange 14 having the spark plug slot 15. One wall of the slot is preferably beveled as at 14a in the same manner as illustrated in the construction shown in Fig. 11, so that an obtuse angle α is provided between the plane of this wall of the slot and the line "b" tangent to the impact surface at the trailing edge thereof.

The wall of the slot 15 opposite the wall 14a is, in this form, unlike the corresponding walls in the previously described modifications, not of the same contour from top to bottom of the flange. The upper part of this wall preferably extends inwardly of the periphery of the cylinder in a generally radial direction for the full thickness of the flange 14, as indicated at 14b. below the portion 14b the corner of the flange at the trailing edge of the impact surface is rounded off as at 14c, the contour of this rounded off portion being indicated by the dotted line in Fig. 15.

The manner in which the present embodiment functions is as follows:

Injection of fuel takes place during the latter part of the compression stroke of the piston when the piston is below the upper end of its stroke but high enough so that at least the upper part of flange 14 is in the path of the injected fuel, and during a material part of the period of injection the portion 14b of the wall is in the same transverse zone as the plug 2. During this period of the cycle, prior to ignition and during the time when the injected fuel is being carried by the moving air past the electrodes of the spark plug, the electrodes are protected from direct impingement of fuel thereagainst as the piston approaches the upper end of its stroke, that is, the position shown in Fig. 14. The portion 14c of the flange comes opposite the plug just prior to ignition, and, after a material part of the combustion charge has passed the electrodes of the plug, diffusion of the charge into the spark plug pocket is facilitated by the rounded off or beveled portion 14c of the flange. By means of this arrangement protection of the spark plug electrodes against fouling, due to impingement thereagainst of unatomized fuel, is prevented and at the same time unfailing ignition is further insured by facilitation of diffusion of a part of the charge to the air gap between the electrodes, just prior to ignition and after movement of the major portion of the charge past the spark plug pocket. Obviously this additional feature cannot advantageously be employed in those forms of the apparatus where the flange forming the impact surface is fixed relative to the spark plug.

In all of the preceding arrangements the invention has been shown as applied to four cycle engines in which movement of the air prior to the injection of fuel is caused by admission of the air through a skirted inlet valve, which valve causes the air to enter the engine cylinder with a rotary motion that continues during the suction and ensuing compression stroke of the piston.

Figure 16:
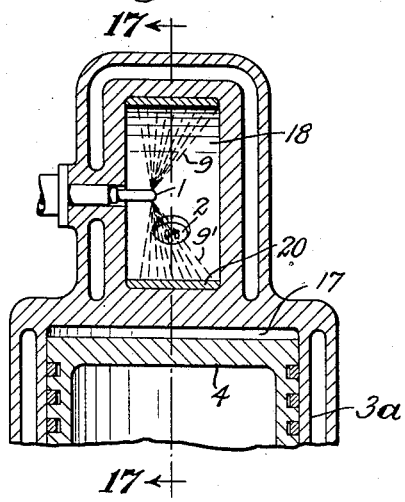
Fig. 16 is a more or less diagrammatic view similar to Fig. 1 and illustrating the application of the invention to a two cycle engine; and, Fig. 17 is a section taken on the line 17—17 of Fig. 16.
Figure 17:
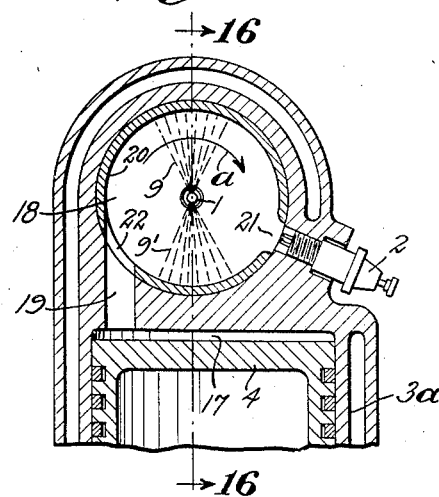

Obviously, within the scope of the invention, other types of engines may be employed and in Figs. 16 and 17 I have illustrated in more or less diagrammatic fashion a combustion chamber arrangement suitable for engines of the two cycle type. Referring now to these figures, the cylinder 3a, in which is located piston 4, is extended to provide above the clearance space 17 a combustion chamber 18 in the form of a body of revolution preferably cylindrical. The clearance space 17 and combustion chamber 18 are connected by a passage 19 opening tangentially into the combustion chamber 18 so that on the compression stroke of the piston the air charge admitted to the cylinder through the usual ports (not shown) is forced into the combustion chamber with a generally rotary motion in the direction indicated by the arrow "a". Fuel is injected through nozzle 1 radially of the combustion chamber and in one or more jets such as those indicated at 9 and 9'. While radial injection has been illustrated, injection across a cord in the same manner as indicated in Fig. 2, for example, may obviously be employed. The combustion chamber is provided with a liner 20 forming the impact surface and provided with a slot 21 corresponding to the slot 15 in the previously described modifications. Liner 20 is also provided with a slot 22 through which communication is provided between passage 19 and chamber 18. It will be evident that the walls of the slot 21 may be formed so as to incorporate one or more of the features described in conjunction with the various modifications hereinbefore described and illustrated.

From the foregoing description it will be apparent that the present invention is capable of being carried out in many different types of engines and with many different specific forms of cylinder construction. In all cases the invention provides an impact surface which, as previously noted, prevents direct contact with the cylinder wall of fuel in liquid form and provides an impact surface so situated with respect to the electrodes of the spark plug or the equivalent elements of any other form of igniting means, that these elements are protected against direct impingement of fuel as injected or as carried by the moving air. This arrangement of the impact surface is sufficient to insure dependable ignition insofar as the factor of fouling of the ignition means is concerned, but I have found that the results obtained by this arrangement alone may be made even more satisfactory by beveling one wall of the pocket in which the igniting means is situated and, in some forms of apparatus, by making a part of the wall of the pocket passed by the moving air, of rounded or beveled form as shown in Fig. 14.

Forms of apparatus other than those hereinbefore described by way of example will occur to those skilled in the art and it will be understood that the invention embraces all such departures from the forms herein illustrated as may fall within the scope of the appended claims when they are given the broadest interpretation to which they are entitled consistent with the state of the prior art.

What I claim is:

1. In an internal combustion engine, means forming a combustion chamber, means forming a non-igniting impact surface within the chamber, means for causing an air stream to pass across said surface, means for forcing fuel across the path of movement of said air stream toward said surface to produce a combustible charge and means for igniting said charge located adjacent to the trailing edge of said surface and back of a tangent to said surface at the trailing edge thereof.

2. In an internal combustion engine, means forming a combustion chamber, means forming a non-igniting impact surface within the chamber, means for introducing air into said chamber and for causing the air to rotate past said surface, means for injecting finely divided fuel across the path of movement of the rotating air toward said surface to form a combustible charge and means for causing local ignition of said charge, said last named means being located immediately adjacent to the trailing edge of said surface and radially more remote from the axis of air rotation than the trailing portion of said surface.

3. In an internal combustion engine, a cylinder forming a combustion chamber, a piston having a part forming an impact surface within said chamber, means for introducing air into said chamber and for causing the air to rotate past said surface, means for injecting finely divided fuel across the path of movement of the rotating air toward said surface to form a combustible charge, and means for causing local ignition of said charge, said last named means being shielded by said part from direct contact with the rotating air.

4. In an internal combustion engine, a cylinder forming a combustion chamber, a piston having a flange forming an impact surface extending upwardly from the piston head, means for introducing air into said chamber and for causing the air to rotate past said surface, an injection nozzle for directing a spray of finely divided fuel across the path of movement of the rotating air toward said impact surface, and an electric ignition plug having electrodes located in said chamber and shielded by said flange from direct contact with said rotating air.

5. In an internal combustion engine, a cylinder forming a combustion chamber, a piston having a peripheral slotted flange forming an impact surface extending above the piston head, means for introducing air into said chamber and for causing air to rotate past said surface, an injection nozzle for directing a spray of finely divided fuel across the path of movement of the rotating air toward said impact surface, and an electric ignition plug having electrodes located in said chamber, said plug being positioned so that the electrodes are situated in a slot in said flange out of the path of direct movement of the rotating air when the piston is adjacent to the inner end of its stroke.

6. In an internal combustion engine, means forming a combustion chamber, means forming a non-igniting impact surface within the chamber, means for causing an air stream to pass across said surface, means for forcing fuel across the path of movement of said air stream toward said surface to produce a combustible charge and an electrical ignition plug for causing local ignition of said charge, said plug comprising electrodes located adjacent to the trailing edge of said surface and having an insulating portion back of a tangent to said surface at the trailing edge thereof.

7. In an internal combustion engine, a cylinder forming a combustion chamber, a part forming an impact surface within said chamber, means for introducing air into said chamber and for causing air to pass across said surface, means for injecting finely divided fuel toward said surface across the path of movement of the air to form a combustible charge and electrical means for causing local ignition of said charge, said electrical means comprising electrodes having an insulating portion shielded by said part from direct contact with the moving air.

8. In an internal combustion engine of the kind having a combustion chamber in which a combustible mixture of air and finely divided fuel is caused to pass across a pocket which is in communication with the combustion chamber and in which is located an ignition device, a member having a surface providing the side wall of the pocket which is passed last by said mixture, said surface being disposed so as to deflect the mixture away from the pocket.

9. In an internal combustion engine of the kind having a combustion chamber in which a combustible mixture of air and finely divided fuel is caused to rotate past a pocket in the side wall of the combustion chamber and in which pocket an ignition device is located, a member having a surface providing the side wall of the pocket facing the direction of rotation of the mixture, said surface being disposed to deflect the mixture inwardly of the combustion chamber and away from the pocket.

10. In an internal combustion engine of the kind having a piston and a combustion chamber in which a combustible mixture of air and finely divided fuel is caused to pass in front of an ignition device in communication with the combustion chamber, the combination with said piston of a peripheral flange thereon forming the side wall of the combustion chamber when the piston is at one end of its stroke, said flange having an opening therein adapted to move to a position in front of said ignition device as the piston moves to said one end of its stroke, the side wall of said opening which is passed last by said mixture being beveled to deflect the mixture away from said opening.

11. In an internal combustion engine of the kind having a piston and a combustion chamber in which a combustible mixture of air and finely divided fuel is caused to pass in front of an ignition device in communication with the combustion chamber, the combination with said piston of a peripheral flange thereon forming the side wall of the combustion chamber when the piston is at one end of its stroke, said flange having an opening therein adapted to move to a position in front of said ignition device as the piston moves to said one end of its stroke, a portion of the side wall of said opening which is passed first by said mixture being cut away to permit the mixture to pass closer to the ignition device at the time when said cut-away portion is opposite the ignition device than at other times.

12. In an internal combustion engine of the kind having a piston and a combustion chamber in which a combustible mixture of air and finely divided fuel is caused to pass in front of an ignition device in communication with the combustion chamber, the combination with said piston of a peripheral flange thereon forming the side wall of the combustion chamber when the piston is at one end of its stroke, said flange having an opening therein adapted to move to a position in front of said ignition device as the piston moves to said one end of its stroke, the side wall of said opening which is passed last by said mixture being beveled to deflect the mixture away from said opening, and a portion of the side wall of said opening which is passed first by said mixture being cut away to permit the mixture to pass closer to the ignition device at the time when said cut-away portion is opposite the ignition device than at other times.

13. In an internal combustion engine of the kind having a piston and a combustion chamber in which a combustible mixture of air and finely divided fuel is caused to pass in front of an ignition device in communication with the combustion chamber, the combination with said piston of a peripheral flange thereon forming the side wall of the combustion chamber when the piston is at the inner end of its stroke, said flange having an open ended slot adapted to move to a position in front of said ignition device as the piston moves to said inner end of its stroke, the lower portion of the side wall of said slot which is passed first by said mixture being cut away to permit the mixture to pass closer to the ignition device at the time when said cut-away portion is opposite said ignition device than at other times.

14. In an internal combustion engine of the kind having a combustion chamber in which a combustible mixture of air and finely divided fuel is caused to rotate past a pocket in the side wall of the combustion chamber in which is located an ignition device, a member having a surface providing the side wall of the pocket facing the direction of rotation of said mixture, said surface being disposed at an obtuse angle with respect to a line tangent to the wall of the combustion chamber and at the opposite side of said pocket whereby the rotating mixture striking said surface is deflected inwardly of the combustion chamber and away from said pocket.

15. In an internal combustion engine of the kind having a cylinder, an ignition device in the cylinder, a piston in the cylinder and means for introducing air and causing rotation thereof in the cylinder, the combination with said piston of means forming a part thereof for causing the rotating air to pass in front of said ignition device and at different distances therefrom in different positions of the piston.

16. In an internal combustion engine of the kind having a cylinder, ignition means in the cylinder, a piston in the cylinder, means for introducing air and causing rotation thereof in the cylinder and means for injecting finely divided fuel in the rotating air, the combination with said piston of means forming a part thereof for causing the rotating air after it has passed through the injected fuel to pass in front of said ignition device and spaced therefrom a greater distance during the first portion of the injection period than during the latter portion of said period.

17. In an internal combustion engine of the kind having a cylinder providing a combustion chamber in which a combustible mixture of air and finely divided fuel is caused to pass across a pocket which is in communication with the combustion chamber and in which is located an ignition device, the combination with said cylinder of an annular member seated therein and forming the side wall of said combustion chamber, said member having a surface providing the side wall of the pocket which is passed last by said mixture, said surface being disposed to deflect the mixture away from the pocket.

18. In an internal combustion engine of the kind having a cylinder and a separable cylinder head and having a combustion chamber in which a combustible mixture of air and finely divided fuel is caused to pass across a pocket which is in communication with the combustion chamber and in which is located an ignition device, the combination with said cylinder head of an annular flange thereon adapted to project into said cylinder and forming the side wall of said combustion chamber, said flange having a surface providing the side wall of the pocket which is passed last by said mixture, said surface being disposed to deflect the mixture away from the pocket.

19. A piston for internal combustion engines comprising an upstanding peripheral flange, said flange having an opening therein, one side wall of said opening being beveled so as to deflect inwardly of the flange a medium passing across said opening and striking said side wall.

20. A piston for internal combustion engines comprising an upstanding peripheral flange, said flange having an opening therein, one side wall of said opening being beveled so as to deflect inwardly of the flange a medium passing across said opening and striking said side wall and a portion of the side wall of said opening opposite the first mentioned side wall being cut away to facilitate entry of a medium passing across said opening into the portion of the opening adjacent to said cut-away portion.

KNUT JONAS ELIAS HESSELMAN.